United States Patent Office 3,788,868
Patented Jan. 29, 1974

3,788,868
METHOD FOR MAINTAINING FLUIDITY OF CEMENT COMPOSITIONS
Toshiyuki Kitsuda, Yokohama, Choji Yamakawa, Wakayama, and Kenichi Hattori, Tokyo, Japan, assignors to Kao Soap Co., Ltd. and Japanese National Railways, Tokyo, Japan
Filed Dec. 19, 1972, Ser. No. 316,493
Claims priority, application Japan, Dec. 25, 1971, 46/1,134
Int. Cl. C04b 7/02
U.S. Cl. 106—90      7 Claims

ABSTRACT OF THE DISCLOSURE

The fluidity of cement compositions can be maintained by adding to the cement composition a non-retarding, non-air-entraining cement dispersing agent selected from the group consisting of (a) water-soluble salts of condensates having molecular weights of not less than 1500, and obtained by condensing with formaldehyde sulfonated products of monocyclic or fused polycyclic aromatic benzenoid hydrocarbon compounds and (b) water-soluble salts of sulfonated products of fused polycyclic aromatic benzenoid hydrocarbon compounds having at least 3 benzene rings, the dispersing agent being added at at least two chronologically spaced intervals or continuously so that the fluidity of the cement composition can be maintained over an extended period of time.

BACKGROUND OF THE INVENTION

Field of the invention

This invention relates to a method for maintaining the fluidity of a hydraulic cement composition, such as hydraulic cement grout, mortar and concrete, for a long period of time. The invention is particularly adapted for the purpose of producing a high strength hardened concrete having a compressive strength of not less than 800 kg./cm.$^2$.

Description of the prior art

A hydraulic cement composition comprising hydraulic cement, water and, optionally, aggregate such as sand, gravel or the like, gradually loses fluidity after the mixing operation is completed because of the progress of setting or curing (which phenomenon is generally called slump loss in the case of concrete). Loss of fluidity of the cement composition causes troubles in the steps or operations of cement grouting, concrete pouring and the like. Therefore, according to the requirement of JIS (Japanese Industrial Standard) A-5308, the time for transfer of ready mixed concrete should be less than 1.5 hours. Accordingly, when a long time is required between (1) mixing and (2) grouting or pouring, it is necessary to prevent the occurrence of slump loss. In order to restore the fluidity, a method of adding water to a cement composition of reduced fluidity, or other similar method, has heretofore been adopted. In such method, however, the water-cement weight ratio (which will be referred to as "W/C ratio" hereinbelow) is changed by the addition of water, which results in undesired phenomena, such as reduction of the strength of the resulting product or structure and increased shrinkage cracks. In some cases, a method comprising adding a retarding agent has been adopted, but this is unsatisfactory because when the retarding agent is added in such an amount that the desired slump may be maintained for a long time, insufficient hardening or non-hardening of the cement composition tends to occur.

Various cement dispersing agents have been known, and the degree of the slump loss may be reduced to some extent by appropriate selection of the kind and amount of such dispersing agent added to the cement mix. It is, however, impossible to maintain the fluidity of a cement composition for a long period of time by a one-time addition of dispersing agent to the cement mix.

SUMMARY OF THE INVENTION

Figure 1:
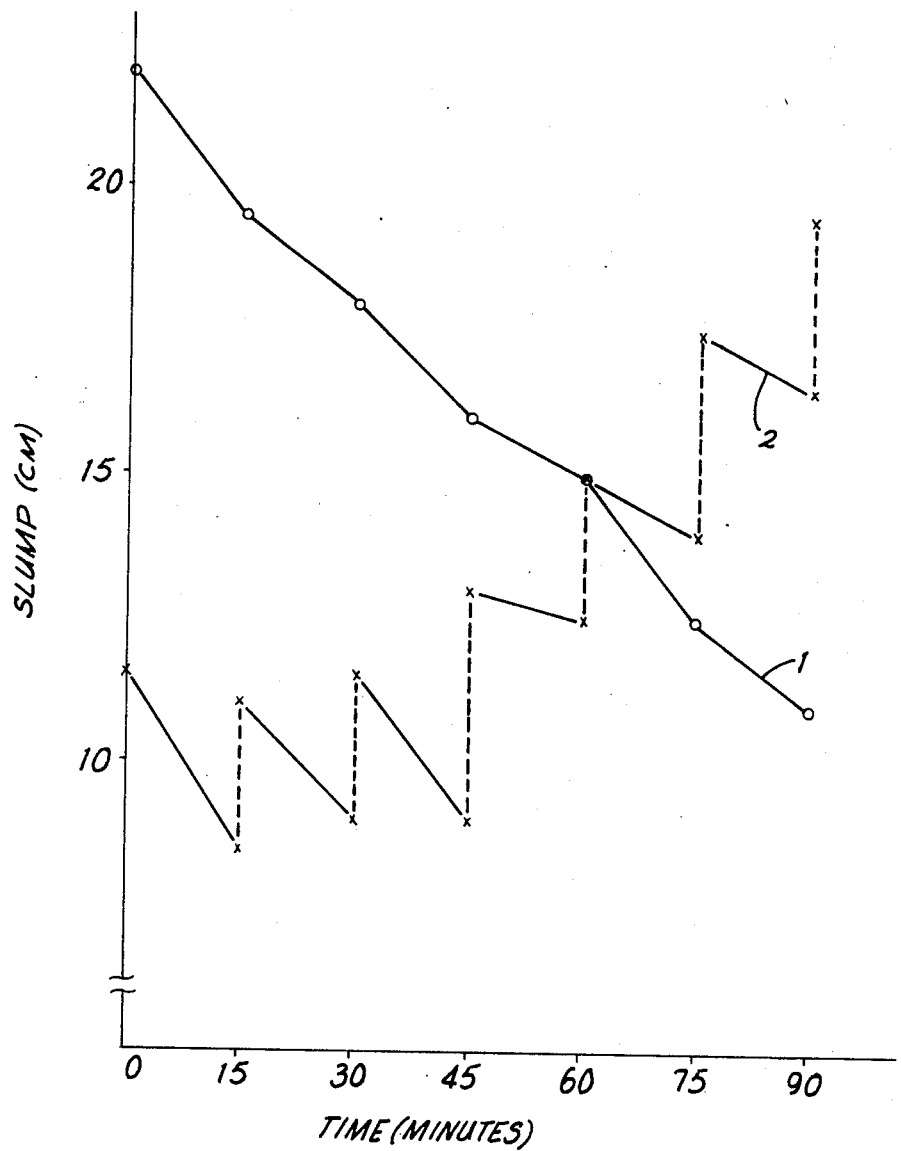
FIGS. 1 and 2 are graphs illustrating the effects attained by the addition of dispersing agent by the method of this invention.

According to this invention, the slump loss is prevented or the slump value is maintained above a prescribed minimum level by adding to the cement mix a specific non-retarding, low foaming dispersing agent, which will be described in detail hereinbelow, the agent being added at at least two chronologically separated times or continuously over an extended time period. This invention provides a cement dispersing method whereby it is possible to ensure the fluidity of a cement composition for a time period longer than 1.5 hours as stipulated by the above-mentioned JIS standard, even for more than 2 hours.

In accordance with this invention, it is possible not only to reduce the slump loss or to maintain it at a low level, but also to manufacture a super high strength concrete (having a compressive strength of more than 800 kg./cm.$^2$) either at concrete manufacturing plants or at construction sites by using no excess water to maintain or control the slump value at a prescribed level. Moreover, the method of this invention is characterized by the fact that it does not cause retardation of hardening of the cement composition. More specifically, when the dispersing agent of this invention is added in a total amount of 2% by weight, calculated as the solids, based on the weight of the cement, the resulting cement composition hardens within 24 hours.

Addition of conventional retarding dispersing agents such as hydroxycarboxylic acids, lignin sulfonates and polyoxyethylene derivatives is not suitable for attaining the objects of this invention.

As the cement dispersing agent, water-soluble salts of condensates, having molecular weights of 1500–10,000, obtained by condensing with formaldehyde, sulfonated products of monocyclic or fused polycyclic benzenoid aromatic hydrocarbon compounds having from 1 to 12 benzene rings and water-soluble salts of sulfonated products of fused polycyclic benzenoid aromatic compounds having from 3 to 12 fused benzene rings are used in this invention, for example, water-soluble salts obtained by condensing with formaldehyde, sulfonated products of aromatic compounds including aromatic hydrocarbons such as benzene, naphthalene, fluorene, anthracene, phenanthrene, pyrene, naphthacene, pentacene, coronene, hexacene, heptacene, octacene, nonacene, decene, undecacene, dodecacene and acenaphthene, aromatic hydrocarbon mixtures such as creosote oil and petroleum cracked fractions consisting essentially of mixtures of the above-mentioned aromatic compounds, and derivatives thereof having 1 to 2 substituents selected from alkyl groups having 1 or 2 carbon atoms. As the water-soluble salts there may be mentioned alkali metal salts, ammonium salts, alkaline earth metal salts and water-soluble salts of lower amines such as methylamine, ethanolamines and morpholine. Sulfonated benzenoid aromatic hydrocarbons, having at least 3 benzene rings can be used directly in the form of the corresponding water-soluble salts, without being condensed with formaldehyde.

The above-mentioned condensates, having molecular weights of 1500–10,000, have the formula $$\left[ \begin{array}{c} SO_3X \\ | \\ Ar-CH_2 \\ | \\ (R)_q \end{array} \right]_n$$

wherein

Ar is benzene or fused polycyclic aromatic benzenoid hydrocarbon having from 2 to 12 benzene rings, such as

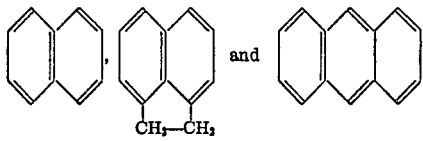

R is hydrogen, methyl or ethyl radical
X is a water-solubilizing cation selected from the group consisting of alkali metals, alkaline earth metals, ammonium and lower amines,
$q$ is 1 or 2, and
$n$ is a number sufficient to provide a molecular weight of 1,500–10,000.

The above-mentioned water-soluble salts of sulfonated products of fused polycyclic benzenoid aromatic compounds have the formula $$\begin{array}{c} (SO_3X)_p \\ | \\ Ar' \\ | \\ (R)_q \end{array}$$

wherein Ar' is a fused polycyclic aromatic benzenoid hydrocarbon having from 3 to 12 benzene rings, such as

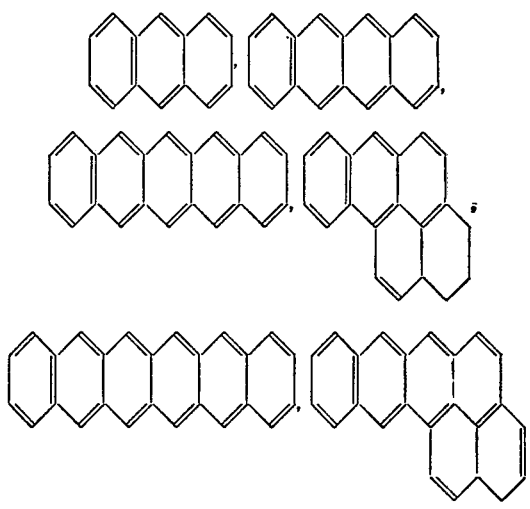

and

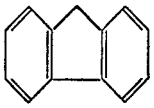

and X is a water-solubilizing cation selected from the group consisting of alkali metals, alkaline earth metals, ammonium and lower amines. R is as above; $p$, $q$ is 1 or 2.

Retarding dispersing agents such as lignin sulfonates and gluconates are not suitable because the use of such dispersing agents is accompanied by retardation of hardening and other disadvantages. For instance, when such retarding dispersing agents are added in amounts such that they will not detrimentally affect the strength of concrete, the fluidity-maintaining effect sought by this invention cannot be attained at all. When the amounts of such retarding dispersing agents are increased extremely, although the recovery of slump is observed more or less, the initial strength is extremely reduced, or insufficient hardening or non-hardening occurs. Therefore, the use of such retarding dispersing agents is not acceptable for the purposes of the present invention. Especially, accidents due to non-hardening of concrete caused by excessive addition of such retarding agent made by mistake at the construction site is one of most dangerous risks to workers in the construction field.

Water-soluble salts of formaldehyde condensates, having molecular weights of less than 1500, of sulfonated products of aromatic compounds are unsuitable for the purposes of this invention because these are air-entraining cement dispersing agents and they do not possess the properties aimed at in the present invention.

The dispersing agent to be used in this invention is free of any constituent having a property of retarding hardening and it has a low foaming property and a high dispersing ability.

The functions of dispersing agents in cement compositions are generally presumed to be as follows:

On surfaces of portland cement particles wetted with water, the hydration reaction of alite ($3CaO \cdot SiO_2$) is immediately caused to occur according to the following equation:

$$2(3CaO \cdot SiO_2) + 6H_2O \rightarrow 3CaO \cdot 2SiO_2 \cdot 3H_2O + 3Ca(OH)_2$$

and a gel of tobermorite ($3CaO \cdot 2SiO_2 \cdot 3H_2O$) is formed on the surfaces of the cement particles. Coincidentally, a gel of ettringite ($3CaO \cdot Al_2O_3 \cdot 3CaSO_4 \cdot 32H_2O$) (also called cement bacillus or calcium sulfoaluminate) is formed from tricalcium aluminate ($3CaO \cdot Al_2O_3$) dissolved from the cement particles and gypsum dissolved from the gypsum particles according to the following reaction:

$$3CaO \cdot Al_2O_3 + 3CaSO_4 + 32H_2O \rightarrow$$
$$3CaO \cdot Al_2O_3 \cdot 3CaSO_4 \cdot 32H_2O$$

Thus, the apparent viscosity of the system is increased greatly and setting is brought about. The gel is considered to be an agglomerate composed essentially of amorphous or ultra microcrystalline particles and the total surface area of the system is unexpectedly larger than the surface area of the original cement particles ($3-8 \times 10^3$ cm.$^2$/g.). It is said that the surface area of the gel is about $2 \times 10^6$ cm.$^2$/g., which is about $10^3$ times the surface area of the original cement particles. It is also said that only 2–3% of the total cement particles undergo the above hydration reaction within 1 to 2 hours and that the surface area is increased so as to be about 20–30 times the original concrete particle surface area (see "Zement Chemie für Bauingenieure" written by W. T. Czernin).

We have made this invention based on the finding that when a mono-molecular or multi-molecular film of the dispersing agent is formed on the newly formed outer surface of such amorphous or ultra microcrystalline particles to increase the surface electric potential, the apparent gel structure of the system may be converted to a sol structure and hence, the slump loss can be prevented because of the redispersion of the particles. When a preselected amount of a dispersing agent is added at one time to the cement mix, it is adsorbed in the fine pores of the original cement particles or in the gel hydrated on the surface of cement particles or in the flocks in the bulk solution at the later stage, almost all of the dispersing agent thus added at one time does not act effectively as a dispersing agent and the charge on the outermost layer of the particles is not raised to the degree necessary for dispersion. On the other hand, we have discovered, according to our invention, that if only a part of said preselected amount of the dispersing agent is added at first and the remainder of the dispersing agent is added in a "split" manner, i.e., on one or more subsequent occasions after the fluidity has been reduced, the amount of the dispersing agent adsorbed in the cement particle pores or the gel formed on the surface of cement particles, or in the bulk solution (which absorbed amount exhibits no dispersing effect) is reduced. Therefore, after each addition the dispersing agent is present in an amount sufficient for dispersing newly formed microcrystals fully. Thus, the "split" addition of the preselected amount of the dispersing agent insures that more of the agent is effective for dispersing purposes, the dispersing agent is effective at all times and the fluidity of the cement mix is maintained at a high level over an extended period of time. This is unexpectedly superior in comparison with the case where the entirety of the dispersing agent is added to the cement mix at one time. Based on the above finding, we have arrived at this invention.

It is said that the amount of water theoretically necessary for hardening of cement is about 25 wt. percent ($W/C=0.25$). However, when a cement dispersing agent is not used, the cement is not fluid unless water is added in an amount exceeding about 40 wt. percent. A watertight concrete which can be processed with the addition of less than about 40 wt. percent of water and which can give a relatively high strength, has been manufactured by adding a cement dispersing agent, but such method is still insufficient for maintaining the fluidity for a long time and a method that can maintain a sufficient fluidity for more than 1 hour with a reduced $W/C$ ratio has not been developed as yet.

In accordance with this invention, even in the case of a cement composition for super high strength, in which the water content is extremely reduced to, for instance, a $W/C$ ratio of less than 30 wt. percent, by the addition of a substantial quantity of the dispersing agent, the values of the slump and W/C ratio can be maintained or controlled at prescribed levels by determining the amounts of the dispersing agent added throughout the "split" addition. This can be established by experiments, depending on the length of the time period during which the fluidity is required in the cement composition, namely the period between the mixing and the grouting or pouring, and by conducting the divided addition at appropriate intervals. Therefore, according to this invention, it is possible to manufacture a super high strengh concrete (such as for a long and large concrete bridge of prestressed concrete) even in the field.

The dispersing agent may be added in the form of a concentrated aqueous solution (or slurry), but it is also possible to add it in the state of a dry powder. Therefore, even if an unexpectedly long time is required from the mixing step to the grouting or pouring step (for instance, 1.5–4 hours), the fluidity can be maintained without greatly changing the $W/C$ ratio.

In this invention the times of adding the dispersing agent are not critical so long as the fluidity of the cement mix is maintained above the desired value. Additional dispersing agent can be added whenever the fluidity falls to a selected value. The total amount of the dispersing agent added to the cement mix is not critical. It is added in an amount suitably determined depending on the desired properties of the cement composition, but the maximum upper limit for the total amount of the dispersing agent is usually less than 5 wt. percent based on the cement composition. In general, the first addition of the dispersing agent is in an amount of from about 0.01 to about 1.5 wt. percent dispersing agent, calculated as the solids, based on the weight of the hydraulic cement, in order to get appropriate workability. Thereafter, subsequent doses or additions are made at spaced intervals, each addition being in an amount of 0.01–1.0% at one time to maintain appropriate workability. In a preferred procedure the amount added at first is from 0.05 to 0.5 wt. percent and 0.04–0.07 wt. percent is added each time at intervals of 10–20 minutes, and the total amount of the dispersing agent added to the cement composition should not exceed 5 wt. percent. However, depending on the desired properties of the cement composition, the first addition of the dispersing agent may not be required. In such cases, the total amount of dispersing agent of less than 5 wt. percent is preferably added at least two chronogically spaced intervals, each time in an amount of 0.04–0.07 wt. percent based on the cement composition. Of course, it is also possible to control the fluidity at the prescribed value by adding continuously the dispersing agent while measuring the fluidity of the cement composition according to an appropriate method, and such embodiment is included in the scope of this invention.

EXAMPLE 1

60 kg. of cement (high early strength portland cement produced by Chichibu Cement Co., Japan), 47.9 kg. of fine aggregate (river gravel produced at Kinokawa, Japan, and having a specific gravity of 2.58), 113.2 kg. of course aggregate (crushed stone produced at Yura, Japan and having a specific gravity of 2.62), 17.6 kg. of water and 1.08 kg. (1.8% based on cement) of a dispersing agent (43% aqueous solution of sodium salt of a formaldehyde condensate of naphthalene sulfonic acid having an average molecular weight of about 2000) were mixed for 90 seconds in a mixer of the forcible agitation type. The slump of the composition was measured to be 22.0 cm. by employing a slump cone having a height of 30 cm. (JIS A1101–50). When the composition was allowed to stand still for 15 minutes and then mixed for 30 seconds, the slump was measured to be 19.5 cm. according to the same measuring method. In the same manner as above, the slump was measured at every 15 minutes. The results are as shown below.

| Time (minutes): | Slump (cm.) |
|---|---|
| 0 | 22.0 |
| 15 | 19.5 |
| 30 | 18.0 |
| 45 | 16.0 |
| 60 | 15.0 |
| 75 | 12.5 |
| 90 | 11.0 |

The slump of a composition prepared in the same manner as above, except that the initial amount of the dispersing agent was changed to 0.72 kg. of 43% solution, was found to be 11.5 cm. When the composition was allowed to stand still for 15 minutes and then mixed for 30 seconds, the slump was measured to be 8.5 cm. When 0.06 kg. of the dispersing agent (43% solution) was added to the composition and it was mixed for 30 minutes, the slump was measured to be 11.0 cm. In the same manner as above, at every 15 minutes, an additional 0.06 g. quantity of the dispersing agent was added and the slump was measured. The results are as shown below.

|  | Slump (cm.) | |
|---|---|---|
|  | Before addition | After addition |
| Time (minutes): |  |  |
| 0 |  | 11.5 |
| 15 | 8.5 | 11.0 |
| 30 | 9.0 | 11.5 |
| 45 | 9.0 | 13.0 |
| 60 | 12.5 | 15.0 |
| 75 | 14.0 | 17.5 |
| 90 | 16.5 | 19.5 |

NOTE.—The slump values given in the left column under the heading slump (cm.) are those measured before addition of the dispersing agent and the slump values in the right column are those measured after addition of the dispersing agent.

These results are plotted in FIG. 1. From these results, it is seen that the "split" addition (curve 2) is advantageous over the one-time addition (curve 1).

As is seen from FIG. 1, when a cement composition is mixed with a total of 1.8 wt. percent of the dispersing agent (43% solution) by one time addition (curve 1) or by split addition (curve 2), the slump can be maintained above 19 even after 90 minutes in the case of the split addition, which slump value corresponds to the value obtained 15 minutes after the addition in the case where the total amount of the dispersing agent is added at one time at the beginning. In other words, even though the total amounts of the dispersing agent used in the two tests are equal, the split addition provides an improvement in fluidity for more than 75 minutes. If the tests were carried out for a longer time, in view of the slump decrease gradient in curve 2 of the split addition, it will readily be understood that the difference would become greater.

EXAMPLE 3

Compositions were prepared in the same manner as in Example 1 by varying the kind and amount added of the dispersing agent. With respect to each composition, slump values were determined just after the mixing and 90 minutes after mixing (just after the 6th addition in the case of the split addition). The results are as shown below.

| Dispersing agent (43% aqueous solution) | Manner of addition | Slump Just after mixing | Slump 90 minutes after mixing | Compression strength after 28 days (kg./cm.²)[6] |
|---|---|---|---|---|
| Na salt of formaldehyde condensate of sulfonated creosote oil having average molecular weight of 2,000. | Concurrent addition of total amount [1] | 21.5 | 10.5 | 893 |
| | Split addition [2] | 11.5 | 19.0 | 912 |
| Na salt of sulfonated product of aromatic substance composed mainly of hexacene.[5] | Concurrent addition of total amount [3] | 20.5 | 11.0 | 914 |
| | Split addition [4] | 11.0 | 19.0 | 926 |

[1] 1.35 kg.
[2] 0.90 kg. was added at first and 0.075 kg. was added at every 15 minutes.
[3] 1.80 kg.
[4] 1.20 kg. was added at first and 0.10 kg. was added at every 15 minutes.
[5] Petroleum cracking distillation residue.
[6] Sampling is performed 90 minutes after mixing.

In the case of the split addition of this example, the compressive strength of the resulting concrete was as follows:

| Age (days): | Strength (kg./cm.²) |
|---|---|
| 3 | 715 |
| 7 | 799 |
| 28 | 956 |

EXAMPLE 2

Figure 2:
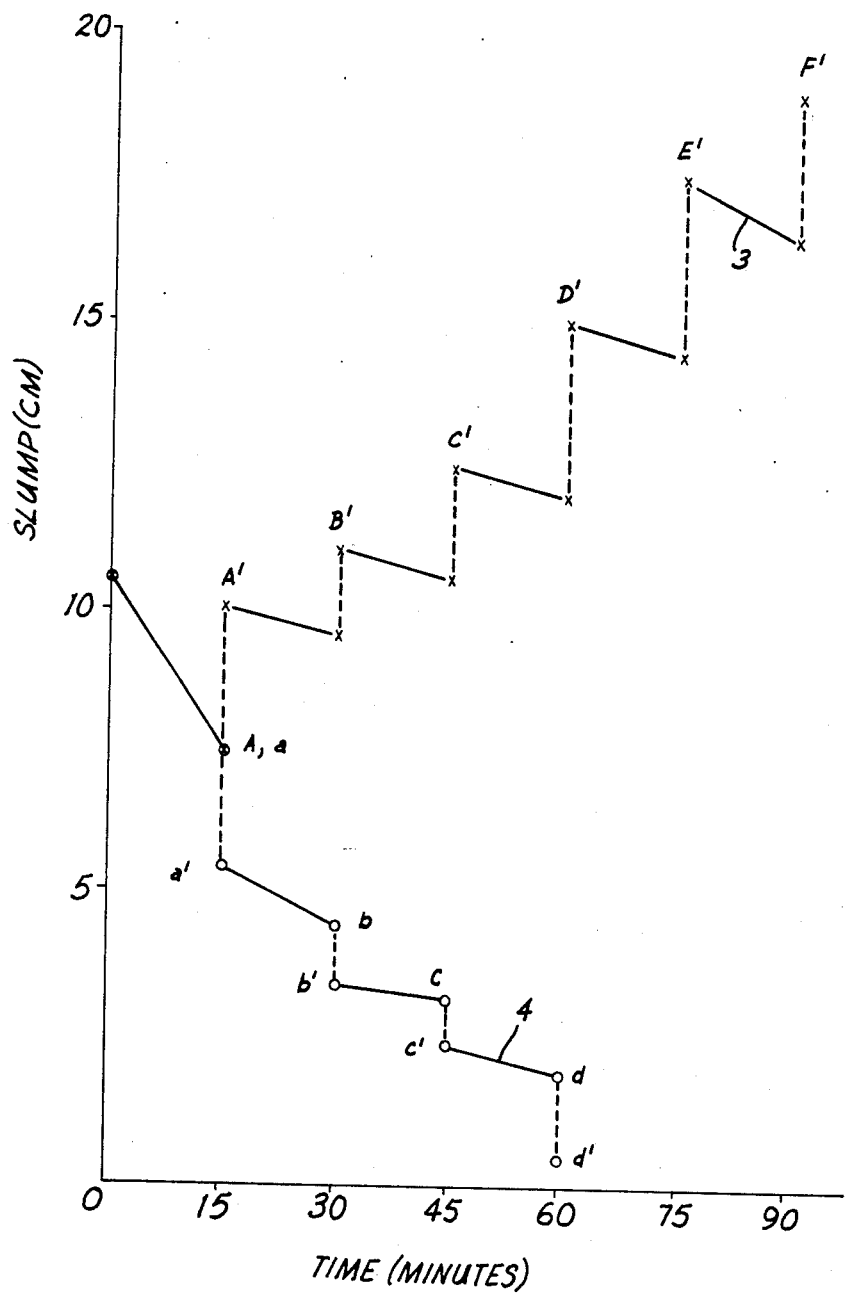

In the same manner as in the case of the split addition of Example 1, a composition having a slump of 11.5 cm. was obtained by initially employing 0.72 kg. of the dispersing agent (43% solution), and adding 0.0258 kg. [0.06 kg. (amount of the dispersing agent aqueous solution in Example 1)×0.43 (concentration of the dispersing agent aqueous solution in Example 1)] of the dispersing agent in the dry powdery state at 15 minutes' intervals. The results are plotted in FIG. 2 (curve 3).

The results obtained when 0.0342 kg. [0.06 kg. (amount of the dispersing agent aqueous solution in Example 1)×0.57 (water content of the dispersing agent aqueous solution in Example 1)] of water was added at 15 minutes' interval instead of the dispersing agent (43% solution) are plotted in FIG. 2 (curve 4).

Points A, B, C ... F are the slump values before addition of the dispersing agent in the dry powdery state and points A', B' ... F' are the slump values after addition of the dispersing agent in the dry powdery state.

Similarly, points a, b ... d are the slump values before addition of water and points a', b' ... d' are the slump values after addition of water at each time.

As is seen from these results, the addition of a small quantity of water is not effective but rather results in a reduction of the slump value (each time). The unexpectedly improved effect of the split addition of the dispersing agent is demonstrated also when the dispersing agent is added in the dry powdery state.

EXAMPLE 4

Test

Compositions consisting of 60 kg. of cement, 47.9 kg. of fine aggregate, 113.2 kg. of coarse aggregate, 17.6 kg. of water and 0.72 kg. of a 43% aqueous solution of Na salt of a formaldehyde condensate of naphthalene sulfonic acid having an average molecular weight of 2400 (dispersing agent aqueous solution is 1.2 wt. percent, based on cement) were prepared in the same manner as in Example 1. Into the respective test compositions were added/a substance indicated in the following table in a manner as indicated in the table. The results are also shown in the table.

| Substance added (43% aqueous solution) | Amount added at every 15 minutes (kg.) | Slump (cm.) 0 min. | Slump (cm.) 60 min. | Slump (cm.) 120 min. | Slump (cm.) 180 min. | Compressive strength (kg./cm.²) Age of 1 day 1[1] | 2[2] | 3[3] | Age of 28 days 1[1] | 2[2] | 3[3] |
|---|---|---|---|---|---|---|---|---|---|---|---|
| Na salt of formaldehyde condensate of naphthalene sulfonic acid (M.W.=2,400) | 0.06 | 10.5 | 15.8 | 22.0 | 24.5 | 508 | 496 | 512 | 966 | 948 | 949 |
| Na salt of formaldehyde condensate of sulfonated creosote oil (M.W.=2,000) | 0.09 | 10.5 | 13.6 | 19.5 | 22.4 | 476 | 480 | 482 | 925 | 913 | 936 |
| Na salt of sulfonated aromatic petroleum fraction (M.W.=850) | 0.12 | 10.3 | 12.6 | 16.4 | 19.7 | 469 | 472 | 476 | 906 | 911 | 914 |
| Na salt of formaldehyde condensate of acenaphthene sulfonic acid (M.W.=2,400) | 0.06 | 10.6 | 14.9 | 21.0 | 22.8 | 496 | 503 | 512 | 952 | 950 | 943 |
| Sodium gluconate (comparison) | 0.06 | 10.0 | 7.0 | 0 | 0 | ([4]) | ([4]) | ([4]) | 563 | 480 | 376 |
| Sodium lignin sulfonate (comparison) | 0.06 | 10.4 | 3.7 | 4.0 | 3.6 | 389 | 265 | ([4]) | 753 | 508 | 462 |

[1] Sample prepared from composition obtained 60 minutes after the primary mixing (average of three samples).
[2] Sample prepared from composition obtained 120 minutes after the primary mixing (average of three samples).
[3] Sample prepared from composition obtained 180 minutes after the primary mixing (average of three samples).
[4] Unhardened.

As is seen from the foregoing results, in the case of sodium gluconate or sodium lignin sulfonate, the slump recovery is insufficient and retardation of the hardening is brought about, whereas in the case of the dispersing agents according to this invention, sufficient results are obtained with respect to the slump recovery and strength.

The embodiments of the invention in which an exclusive property or privilege is claimed are defined as follows:

1. A method for maintaining the fluidity of hydraulic cement compositions, which comprises adding to the hydraulic cement composition over an extended period of time a non-retarding, non-air-entraining, cement dispersing agent selected from the group consisting of
   (a) water-soluble salts of condensates, obtained by condensing with formaldehyde, sulfonates of mono or fused polycyclic benzenoid aromatic hydrocarbons having from 1 to 12 benzene rings, said condensates having a molecular weight of not less than 1500, and
   (b) water-soluble salts of sulfonates of fused polycyclic benzenoid aromatic hydrocarbons having from 3 to 13 benzene rings;

said agent being added either continuously over an extended period of time or in doses at spaced time intervals over an extended period of time, to maintain the fluidity of the cement composition above a predetermined value throughout the entirety of the extended time period.

2. A method according to claim 1, in which the hydraulic cement composition is a portland cement composition.

3. A method according to claim 1, in which the cement dispersing agent is added in the form of either a powder or an aqueous solution.

4. A method according to claim 1, in which in the first addition of the cement dispersing agent, from about 0.01 to about 1.5% by weight of dispersing agent, calculated as the solids, based on the weight of the hydraulic cement, is added to the hydraulic cement composition, and, in each subsequent addition of the cement dispersing agent, from about 0.01 to about 1.0%% by weight of the dispersing agent is added to the hydraulic cement composition.

5. A method according to claim 1, in which, in the first addition of the cement dispersing agent, from about 0.05 to about 0.5% by weight of dispersing agent, calculated as the solids, based on the weight of the hydraulic cement, is added to the hydraulic cement composition, and thereafter doses of about from 0.04 to 0.07% by weight of the dispersing agent are added at intervals of from 10 to 20 minutes.

6. A method according to claim 1, in which the total amount of dispersing agent added to the composition is less than 5% by weight.

7. A method according to claim 1, in which the weight ratio of water:cement in the hydraulic cement composition is in the range of .25:1 to .35:1.

References Cited
UNITED STATES PATENTS

| | | | |
|---|---|---|---|
| 3,582,375 | 6/1971 | Tragesser | 106—90 |
| 3,686,133 | 8/1972 | Hattori et al. | 106—90 |
| 3,277,162 | 10/1966 | Johnson | 106—90 |

JAMES E. POER, Primary Examiner

U.X. Cl. X.R.

106—97